(12) United States Patent
Weaver et al.

(10) Patent No.: US 10,363,584 B2
(45) Date of Patent: Jul. 30, 2019

(54) METHODS FOR REMOVING BARRIER COATINGS, BONDCOAT AND OXIDE LAYERS FROM CERAMIC MATRIX COMPOSITES

(71) Applicant: GENERAL ELECTRIC COMPANY, Schenectady, NY (US)

(72) Inventors: Jared Weaver, Niskayuna, NY (US); Daniel Gene Dunn, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1071 days.

(21) Appl. No.: 14/014,462

(22) Filed: Aug. 30, 2013

(65) Prior Publication Data
US 2015/0059802 A1 Mar. 5, 2015

(51) Int. Cl.
| | | |
|---|---|---|
| *B08B 3/08* | (2006.01) |
| *C04B 41/53* | (2006.01) |
| *F01D 5/00* | (2006.01) |
| *C04B 41/91* | (2006.01) |
| *C04B 41/00* | (2006.01) |
| *F01D 5/28* | (2006.01) |

(52) U.S. Cl.
CPC .............. *B08B 3/08* (2013.01); *C04B 41/009* (2013.01); *C04B 41/5353* (2013.01); *C04B 41/91* (2013.01); *F01D 5/005* (2013.01); *F01D 5/288* (2013.01); *F05D 2240/11* (2013.01); *F05D 2300/6033* (2013.01); *Y02T 50/672* (2013.01)

(58) Field of Classification Search
CPC ......... C04B 35/83; C04B 35/80; C04B 41/91; C04B 41/009; C04B 41/5353; C04B 35/565; C04B 35/806; B08B 3/08; F05D 2300/6033; F05D 2240/11; F05D 5/005; F05D 5/288
See application file for complete search history.

(56) References Cited

U.S. PATENT DOCUMENTS

| | | |
|---|---|---|
| 5,167,721 A | 12/1992 | McComas et al. |
| 6,174,380 B1 | 1/2001 | Rosenzweig et al. |

(Continued)

FOREIGN PATENT DOCUMENTS

| | | |
|---|---|---|
| CN | 101205833 A | 6/2008 |
| CN | 103206264 A | 7/2013 |

(Continued)

OTHER PUBLICATIONS

International Search Report and Written Opinion issued in connection with corresponding PCT Application No. PCT/US2014/048393 dated Nov. 3, 2014.

(Continued)

*Primary Examiner* — Alexander Markoff
(74) *Attorney, Agent, or Firm* — Dority & Manning, P.A.

(57) ABSTRACT

The disclosure relates generally to methods for removing coatings and bond coats of ceramic matrix composites. More specifically, the disclosure relates to, for example, methods of removing a bond coat from a ceramic matrix composite by contacting a ceramic matrix composite with at least one hydroxide at particular temperatures and removing the bond coat from said ceramic matrix composite.

15 Claims, 4 Drawing Sheets

(56) References Cited

U.S. PATENT DOCUMENTS

| | | | |
|---|---|---|---|
| 6,210,488 B1* | 4/2001 | Bruce | B08B 3/12 134/1 |
| 6,274,078 B1* | 8/2001 | Dunyak | B22C 1/00 264/232 |
| 6,296,941 B1 | 10/2001 | Eaton, Jr. et al. | |
| 6,299,988 B1 | 10/2001 | Wang et al. | |
| 6,410,148 B1 | 6/2002 | Eaton, Jr. et al. | |
| 6,428,740 B2 | 8/2002 | Dunyak et al. | |
| 2006/0029723 A1* | 2/2006 | Rigney | B23P 6/002 427/8 |
| 2007/0292710 A1* | 12/2007 | Rigney | C23C 10/02 428/629 |
| 2008/0145643 A1 | 6/2008 | Reynolds et al. | |
| 2010/0255260 A1* | 10/2010 | Lee | C23C 26/00 428/164 |
| 2010/0279845 A1 | 11/2010 | Kebbede et al. | |
| 2011/0027517 A1 | 2/2011 | Kirby et al. | |
| 2012/0328445 A1* | 12/2012 | Ridgeway | F01D 5/286 416/224 |
| 2013/0177441 A1 | 7/2013 | Das et al. | |

FOREIGN PATENT DOCUMENTS

| | | |
|---|---|---|
| EP | 1577499 A2 | 9/2005 |
| JP | H06-287082 A | 10/1994 |
| JP | 2001-226784 A | 8/2001 |
| JP | 2004-158313 A | 6/2004 |
| WO | 200006380 A1 | 2/2000 |

OTHER PUBLICATIONS

Eaton et al., "2001-GT-0513 EBC Protection of SiC/SiC Composites in the Gas Turbine Combustion Environment—Continuing Evaluation and Refurbishment Considerations", Proceedings of ASME TURBOEXPO 2001, pp. 1-8, Jan. 1, 2001.

Unofficial English Translation of Chinese Office Action issued in connection with corresponding CN Application No. 201480047991.7 dated Aug. 23, 2016.

Machine Translation and Notification of Reasons for Refusal issued in connection with corresponding JP Application No. 2016-538924 dated Apr. 10, 2018.

* cited by examiner

METHODS FOR REMOVING BARRIER COATINGS, BONDCOAT AND OXIDE LAYERS FROM CERAMIC MATRIX COMPOSITES

BACKGROUND

The present invention relates to removal of protective coatings from components exposed to high temperatures, such as components of a gas turbine engine.

Higher operating temperatures for gas turbine engines are continuously sought in order to increase efficiency. However, as operating temperatures increase, the high temperature durability of the components of the engine must correspondingly increase. In this regard, materials containing silicon as a matrix material or a reinforcing material, are currently being used for high temperature applications, such as for combustor and other hot section components of gas turbine engines, because of the good capacity of these silicon materials to operate at higher temperatures.

Such high-temperature materials, such as, for example, ceramics, alloys, and intermetallics, offer attractive properties for use in structures designed for service at high temperatures in such applications as gas turbine engines, heat exchangers, and internal combustion engines, for example. However, the environments characteristic of these applications often contain reactive species, such as water vapor, which at high temperatures may cause significant degradation of the material structure. For example, water vapor has been shown to cause significant surface recession and mass loss in silicon-bearing materials. The water vapor reacts with the structural material at high temperatures to form volatile silicon-containing species, often resulting in unacceptably high recession rates.

Components that are exposed to these high temperatures, such as a component within a gas turbine engine, typically include protective coatings. For example, turbine blades, turbine vanes, and blade outer air seals typically include one or more coating layers that protect the component from erosion, oxidation, corrosion or the like to thereby enhance durability and/or maintain efficient operation of the engine.

Environmental barrier coatings (EBC's) are applied to silicon-bearing materials and other material susceptible to attack by reactive species, such as high temperature water vapor. EBC's provide protection by prohibiting contact between the environment and the surface of the material. EBC's applied to silicon-bearing materials, for example, are designed to be relatively stable chemically in high-temperature, water vapor-containing environments. One exemplary conventional EBC system, as described in U.S. Pat. No. 6,410,148, comprises a silicon or silica bond layer applied to a silicon-bearing substrate; an intermediate layer comprising mullite or a mullite-alkaline earth aluminosilicate mixture deposited over the bond layer; and a top layer comprising an alkaline earth aluminosilicate deposited over the intermediate layer. In another example, U.S. Pat. No. 6,296,941, the top layer is a yttrium silicate layer rather than an alumino silicate. An exemplary bond layer, or bond coat is disclosed in U.S. Pat. No. 6,299,988.

Though significant advances have been made with barrier coating materials and processes for producing both the environmentally-resistant bond coat and the barrier coating, there is the inevitable requirement to remove and replace the barrier coating and bond coat under certain circumstances. For example, removal may be necessitated by erosion or impact damage to the ceramic layer during engine operation, or by a requirement to repair certain features such as the tip length of a turbine blade. Removal of the barrier coatings and/or the bond coat may also be necessitated during component manufacturing to address such problems as defects in the coating, handling damage and the need to repeat non-coating-related manufacturing operations which require removal of the barrier coating and/or bond coat, e.g., electrical-discharge machining (EDM) operations.

The current state-of-the-art repair methods often result in removal of the entire barrier coating system, i.e., both the barrier coatings and bond coat, after which the bond coat and barrier coatings must be redeposited. Prior art abrasive techniques for removing barrier coatings have generally involved grit blasting, vapor honing and glass bead peening, each of which is a slow, labor-intensive process that erodes the barrier coatings and bond coat, as well as the substrate surface beneath the coating. With repetitive use, these removal processes eventually destroy the component by reducing the wall thickness of the component.

Therefore, what is needed, inter alia, are new and improved methods for removing barrier coatings and bond coats rapidly and without damage to an underlying substrate, for example a ceramic matrix composite substrate, such as a gas turbine engine component.

SUMMARY

The present invention relates to protective coatings for components exposed to high temperatures, such as components of a gas turbine engine. More particularly, the present invention relates to removal of protective coatings from ceramic matrix composites and, in particular, to rapid chemical removal of such coatings.

One aspect of the present disclosure is a method of removing a bond coat from a ceramic matrix composite, said method comprising: contacting a ceramic matrix composite comprising a bond coat with at least one hydroxide for a sufficient time necessary for said hydroxide to react; and removing the bond coat from said ceramic matrix composite. In one embodiment, substantially all of the bond coat is removed from the ceramic matrix composite component without damaging the ceramic matrix composite component. In another embodiment, the hydroxide is selected from a group consisting of potassium hydroxide, sodium hydroxide, ammonium hydroxide, lithium hydroxide, and tetramethylammonium hydroxide. In a particular embodiment, the hydroxide is sodium hydroxide. In one embodiment, the hydroxide is not a supercritical fluid.

In one embodiment, the ceramic matrix composite comprises oxide or non-oxide fibers in nonoxide matrices. In another embodiment, the ceramic matrix composite comprises SiC fibers in SiC matrices, SiC fibers in silicide containing matrices, SiC fibers in Si—SiC matrices, carbon fibers in carbon matrices, carbon fibers in SiC matrices, or Alumina fibers in SiC matrices. In one embodiment, the bond coat comprises silicon or a silicon-containing substrate. In one embodiment, the hydroxide comprises at least 5 weight % of an hydroxide and the balance is essentially water. In one embodiment, the hydroxide comprises about 10 weight % to about 40% of sodium hydroxide.

In one embodiment of the method, the contacting and removing steps are performed at an elevated temperature and pressure above ambient. In particular, in one example, an elevated temperature is at least about 120 degrees Celsius and an elevated pressure of about 0.1 to 1 MPa. In one embodiment, the solution is at a temperature of at least about 50 degrees Celsius. In one embodiment, the contacting and removing steps are performed simultaneously with providing ultrasonic energy to said liquid. In one embodiment, the ceramic matrix composite with the barrier coating and/or bond coat is contacted with the hydroxide for 30 seconds or more. In one embodiment, the method further includes the step of contacting the substrate with water at a lower temperature than the temperature of said caustic liquid following the step of contacting with said hydroxide. In one embodiment, the coated substrate is immersed in a caustic liquid contained in a vessel open to ambient atmosphere. In one embodiment, the method further comprises removing an oxide layer from the ceramic matrix composite.

One aspect of the present disclosure is a method of removing a barrier coating from a ceramic matrix composite, said method comprising: contacting a coated ceramic matrix composite with a caustic liquid comprising at least one hydroxide for a sufficient time necessary for said liquid to chemically attack the bond coat beneath the barrier coating, causing detachment of said barrier coating from said ceramic matrix composite, thereby removing the barrier coating.

The ceramic matrix composite comprises oxide or non-oxide fibers in nonoxide matrices. In one embodiment, the ceramic matrix composite comprises SiC fibers in SiC matrices, SiC fibers in silicide containing matrices, SiC fibers in Si—SiC matrices, carbon fibers in carbon matrices, carbon fibers in SiC matrices, or Alumina fibers in SiC matrices. In a particular embodiment, the ceramic matrix composite comprises SiC fibers in Si—SiC matrices.

One aspect of the present disclosure is a method of removing an oxide layer from a ceramic matrix composite, said method comprising: contacting a ceramic matrix composite comprising an oxide layer with at least one hydroxide for a sufficient time necessary for said hydroxide to react; and removing the oxide layer from said ceramic matrix composite. The oxide layer, in one example, comprises silica. In one embodiment, the hydroxide is sodium hydroxide.

Another aspect of the present disclosure is a method of removing a bond coat from a ceramic matrix composite, said method comprising: contacting a ceramic matrix composite comprising a bond coat with an aqueous solution of at least one nitrogen containing base for a sufficient time necessary for said solution to react; and removing the bond coat from said ceramic matrix composite. In one embodiment, substantially all of the bond coat is removed from the ceramic matrix composite component without damaging the ceramic matrix composite component.

In one embodiment, the nitrogen containing base is selected from a group consisting of ethylene diamine, pyrazine, ethanolamine, and hydrazine. In a particular embodiment, the nitrogen containing base is ethylene diamine. In one embodiment, the ceramic matrix composite comprises oxide or non-oxide fibers in nonoxide matrices. In another embodiment, the ceramic matrix composite comprises SiC fibers in SiC matrices, SiC fibers in silicide containing matrices, SiC fibers in Si—SiC matrices, carbon fibers in carbon matrices, carbon fibers in SiC matrices, or Alumina fibers in SiC matrices. In one embodiment, the ceramic matrix composite comprises SiC fibers in Si—SiC matrices. In another embodiment, the bond coat comprises silicon or a silicon-containing substrate.

In one embodiment, the solution comprises at least 50 weight % of a nitrogen containing base. In another embodiment, the hydroxide comprises about 50 weight % to about 80 weight % of ethylene diamine, 5 weight % to about 20 weight % pyrocatechol, and 5 weight % to about 50 weight % water. In one embodiment, the contacting and removing steps are performed at an elevated temperature and pressure above ambient. In one embodiment, an elevated temperature is at least about 115 degrees Celsius and an elevated pressure of about 0.1 to 1 MPa. In one embodiment, the solution is at a temperature of at least about 50 degrees Celsius.

In one embodiment, the contacting and removing steps are performed simultaneously with providing ultrasonic energy to said liquid. In another embodiment, the ceramic matrix composite with the barrier coating and/or bond coat is contacted with the solution for 30 seconds or more. In one embodiment, the method further includes the step of contacting the substrate with water at a lower temperature than the temperature of said caustic liquid following the step of contacting with said solution. In another embodiment, the coated substrate is immersed in a caustic liquid contained in a vessel open to ambient atmosphere.

These and other aspects, features, and advantages of this disclosure will become apparent from the following detailed description of the various aspects of the disclosure taken in conjunction with the accompanying drawings.

BRIEF DESCRIPTION OF THE FIGURES

The subject matter, which is regarded as the invention, is particularly pointed out and distinctly claimed in the claims at the conclusion of the specification. The foregoing and other features and advantages of the disclosure will be readily understood from the following detailed description of aspects of the invention taken in conjunction with the accompanying drawings in which:

FIG. 1 shows the same data as the Table 1 infra, except that the oxidized CMC result has been left off. The purpose of this experiment was to evaluate the etch rates of various components in the CMC/bondcoat system. The Si—SiC/SiC CMC coupons represented the base substrate. The silicon coupon represented the bondcoat and the silica coupon represented the thermally grown oxide that is formed on the exposed areas of the CMC during processing heat treatments and use at elevated temperatures. The etch rate data are for 20-25% NaOH solutions in water at ambient pressure. This figure visually demonstrates that the Silicon etches much faster than the CMC, and that the silica etches at a similar rate to the CMC. The high selectivity of the silicon etch rate over the CMC etch rate is important for removing bondcoat because the bondcoat layer has significant thickness (50-150 um) so the high selectivity ensures that there is no damage to the CMC during the etch process. The oxide scale that forms on the exposed surfaces of the CMC during processing and use are generally thin (<10 um) and have very high surface area, so the lower selectivity of silica compared to the CMC is acceptable.

FIG. 2 shows an example of bond coat stripping of a CMC with an Environmental Barrier Coating (EBC). The purpose of this experiment was to demonstrate that the barrier coatings do not have to be removed in order to etch away the bondcoat. The "Before" figure shows a CMC coupon with silicon bondcoat and an EBC. The CMC/Bondcoat/EBC coupon was submerged in a 25% NaOH solution at 90 C for 8 hrs at ambient pressure. After this time, the bondcoat was etched sufficiently to allow the EBC to release intact from the surface of the CMC, demonstrating that the EBC does not have to be removed in order to etch the bondcoat with this process. The remnants of the bondcoat may be removed with further etching, if desired.

FIG. 3 shows an example of bond coat stripping of a CMC that does not have a Barrier Coating. One instance where this may occur is during manufacturing where there is a flaw in the bondcoat and it needs to be removed and replaced before the barrier coating can be applied. Another instance where this may occur is if the barrier coatings is removed by more rapid methods such as grit blasting, but the bondcoat is allowed to remain because of risk of damaging the underlying CMC. In this experiment, a CMC sample with an exposed approximately 4 mil thick bondcoat was etched for 1 hr at 90 C and ambient pressure. After etching, the bondcoat was completely stripped from the surface and there was no damage to the CMC microstructure.

FIG. 4 shows an example of stripping an oxide from the surface of a Si—SiC/SiC CMC. Oxidation of the surface of the CMC occurs during processing and during use, especially where the CMC does not have bondcoat or barrier coating. In particular, this figure shows as-made CMC coupons that were oxidized in air for 100 hrs at 1315 C to produce a silica rich scale on the surface of the CMC. The oxide was removed from the surface by etching in a bath of 25% NaOH at 90 C and ambient pressure for 4 hours. After that time, the oxide was completely removed from the surface as can be seen by the lower micrographs. There was no damage to the CMC microstructure.

DETAILED DESCRIPTION

The present disclosure relates generally to protective coatings for components exposed to high temperatures, such as components of a gas turbine engine. More particularly, the present invention relates to removal of the bond coat and related coatings from ceramic matrix composites.

The use of the terms "a" and "an" and "the" and similar references in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

As used herein, the term "comprising" means various compositions, compounds, components, coatings, substrates, layers, steps, etc., can be conjointly employed in this invention. Accordingly, the term "comprising" encompasses the more restrictive terms "consisting essentially of" and "consisting of."

All amounts, parts, ratios and percentages used herein are by weight unless otherwise specified.

Components located in certain sections of gas turbine engines, such as the turbine, combustor and augmentor, are often thermally insulated or protected from the environment with ceramic layers. These coatings, often referred to as barrier coatings, must strongly adhere to the article, and remain adherent throughout many heating and cooling cycles.

Though significant advances have been made with coating materials and processes for producing both the environmentally-resistant bond coat and the thermal-insulating and environmentally-resistant ceramic layers, there is the inevitable requirement to remove and replace the ceramic layer under certain circumstances. For example, removal may be necessitated by erosion or impact damage to the ceramic layers during engine operation, or by a requirement to repair certain features such as the tip length of a turbine blade. Removal of the bondcoat or ceramic layers may also be necessitated during component manufacturing to address such problems as defects in the coating, handling damage and the need to repeat noncoating-related manufacturing operations which require removal of the ceramic, e.g., electrical-discharge machining (EDM) operations.

The current state-of-the-art repair methods often result in removal of the entire barrier coating system, i.e., both the ceramic layer and bond coat, after which the bond coat and ceramic layer must be redeposited. Prior art abrasive techniques for removing barrier coatings have generally involved grit blasting, vapor honing and glass bead peening, each of which is a slow, labor-intensive process that erodes the ceramic layer and bond coat, as well as the substrate surface beneath the coating. With repetitive use, these removal processes eventually destroy the component by reducing the wall thickness of the component or damaging regions with exposed fibers. Damage is particularly likely when treating an air-cooled turbine blade, whose surface includes cooling holes from which cooling air is discharged in order to cool the external surfaces of the blade.

Consequently, significant effort has been directed to developing nonabrasive processes for removing bondcoat and coatings. One such method is for removing a ceramic layer involves the use of a high pressure waterjet, as reported in U.S. Pat. No. 5,167,721. While this waterjet technique is described as not removing the bond coat, in practice the waterjet can inflict significant damage to bond coats.

Similar to grit blasting techniques, bond coat damage from the waterjet process is particularly likely when treating an air-cooled turbine blade. Damage can be acute around the cooling holes of these blades because ceramic within the holes is anchored by compressive stresses that develop when the newly coated component cools from typical coating temperatures for ceramic deposited by PVD techniques. Consequently, to remove the ceramic from a cooling hole, excessive dwell times are required to overcome this strong mechanical bond as well as the chemical bond between the ceramic and oxide layers, resulting in significant damage or removal of the bond coat in and around the cooling holes. Also, CMCs have exposed fiber ends wherever holes are drilled and these fibers are easily disturbed by mechanical processes.

It has been found that the bond coat is important to the service life of the barrier coating system in which it is employed, and is therefore also important to the service life of the component protected by the coating system. The oxide scale formed is adherent and continuous, and therefore not only protects the bond coat and its underlying substrate by serving as an oxidation barrier, but also chemically bonds the ceramic layer. Nonetheless, bond coats inherently continue to oxidize over time at elevated temperatures, gradually increasing the thickness of the oxide scale. Eventually, the scale reaches a critical thickness that leads to spallation of the ceramic layer. Once spallation has occurred, the component will deteriorate rapidly, and therefore must be refurbished or scrapped at considerable cost.

Bond coat layers of barrier coatings for silicon-containing substrates used in higher temperature applications can experience effective temperatures above about 2200 degree F., e.g., upwards of about 2400 degree F. These bond coat layers are useful with a variety of articles for adhering overlaying corrosion resistant layer-containing barrier coating systems to silicon-containing substrates where the article is operated at, or exposed to, high temperature, corrosive environments, especially higher temperature, corrosive environments that occur during normal gas turbine engine operation. These articles can be in the form of turbine engine (e.g., gas turbine engine) parts and components, including those comprising turbine airfoils such as turbine blades, vanes and blisks, turbine shrouds, turbine nozzles, combustor components such as liners, deflectors and their respective dome assemblies, augmentor hardware of gas turbine engines, etc.

The removal of barrier coatings and bond coat layers as taught in embodiments of this disclosure are particularly useful for removal of such coatings and bond coats from ceramic matrix composite substrates (as suppose to metallic substrates). However, while the following discussion of the embodiments of articles of this invention will be with reference to turbine blades and vanes, and especially the airfoil portions thereof, that comprise these blades and vanes, it should also be understood that the removal methods as disclosed herein may be applied to other articles comprising ceramic matrix composite substrates.

The inventors of the instant application have discovered new and improved methods for removing barrier coatings and bond coat specifically from ceramic matrix composites. The present disclosure provides for the rapid removal of barrier coatings and bond coat without damage to an underlying substrate, such as a gas turbine engine component. In particular, the present disclosure is directed towards a chemical process for removing barrier coatings and bond coats from ceramic matrix composite components without damaging or affecting the base substrate. The process entails using a caustic solution at elevated temperatures to remove the bond coat, for example.

The reaction chamber in which the component is contacted with the caustic liquid is a pressure vessel and is built to withstand high pressures at high temperatures. Pressure in the system is elevated by heating the contents (reaction mixture), by monitoring heat due to exothermic reactions, or by using an external source of compressed gases to overpressurize the vessel. The reaction chamber may be operated in batch fashion; that is, the ingredients of the caustic solution are charged, the unit is closed, and the charge is brought to the desired conditions of temperature and pressure. Continuous or semicontinuous operation can be undertaken if one or more of the reactants are continuously fed and products withdrawn.

In the reaction chamber, the temperature and pressure that is applied may cause the caustic solution to become a supercritical fluid or have properties similar to that of a supercritical fluid. By supercritical fluid it is meant that the surface tension of the fluid is zero or approaches near zero which completely wets the surfaces in contact. In the present disclosure, the inventors have discovered that the caustic solution does not have to be a supercritical fluid for the bondcoat and barrier coating to be removed from ceramic matrix composites. However, if the caustic solution is near or approaches a supercritical state in the reaction chamber during treatment of the CMC with the bondcoat and/or barrier coating, the surface tension is reduced thus enhancing the activity of the caustic solution and its wettability towards fine cracks and pores.

The caustic solution is or may be an admixture of a compound, a base and water. Other admixtures may also be used, such as acetone, liquid ammonia, or liquid carbon dioxide, provided they dramatically lower the surface tension of the fluid during treatment of the barrier coated part in the reaction chamber. Examples of caustic compounds are sodium hydroxide, potassium hydroxide, ammonium hydroxide, lithium hydroxide, tetramethylammonium hydroxide (TMAH), and mixtures thereof. Use of additives, such as surfactants and chelates, to further reduce the surface tension of the caustic solution can be beneficial.

The caustic compound and the water may be present in about a one to one ratio. The concentrations of the bases may range from very dilute, about one weight percent, to very concentrated, about sixty-five weight percent. The amount also depends on the size of the reaction chamber and the size of the part being processed. Commonly known engineering principles can be used to calculate various amounts of the caustic compound and water to remove the barrier coating. In one example, the base is about 1 to about 65 weight percent, the water is about 35 to about 99 weight percent, and an organic compound may be present at from about 1 to about 70 weight percent. In one example, the weight percent for the caustic solution is about 20 weight percent base, 80 weight percent water, and close to or 0 weight percent organic compound.

The temperature and pressure that is used during treatment can vary, depending on the amount and the type of barrier coating to be removed and the capabilities of the reaction chamber. The caustic treatment can be performed at a range of temperatures, pressures, and reaction times. For example, the treatment may involve combinations of ultrasonication, mechanical mixing, and boiling with an autoclave treatment. The autoclave treatment can be conducted under several conditions. For instance, the pressure can range from about 15 pounds per square inch to about 3000 pounds per square inch, and the temperature can range from about 120 degrees Celsius to 250 degrees Celsius. Higher pressures and temperatures can be applied to achieve shorter process times. Lower temperatures without pressure can be used if longer process times are acceptable.

Also, pressurization can be achieved at room temperature using compressed gases. Still yet, the process can start with zero pressure and by increasing the temperature of the reaction mixture, the reaction chamber pressure automatically rises resulting from the increase in the vapor pressure of the reaction mixture. The time to remove the barrier coating/bond coat depends on the amount of the coating/bond coat to be removed and the temperature and pressure conditions that are applied. In one example, the time is between about 0.1 to 8.0 hours. Also, it should be noted that using a mixer, such as a mechanical stirrer, a magnetic stirrer, or an ultrasonicator, at low pressures or high pressures enhances the ability of the caustic solution to remove the coating, especially in torcherous locations, and within a shorter duration of time.

The barrier coating is generally an oxide or layers of oxides such as mullite, barium strontium aluminum silicate, or rare earth silicates. Other oxide or ceramic coatings that act as thermal or environmental barriers may also be referred to as barrier coatings for the purpose of this invention. Herein, bond coats are usually meant to be silicon or silicon-containing compositions. The substrate is, in one example, silicon carbide matrix with silicon carbide fibers. The process is suited for barrier coated parts and hardware used in turbines or on airfoils. An example of a turbine part would be a turbine blade or vane. The term airfoil refers also to turbine parts, such as blades, vanes, buckets, nozzles, and the like. Examples of turbine parts made with CMCs include blades, vanes, nozzles, shrouds, and combustor liners.

Additional substrate materials, that can accommodate a barrier coating for applications other than turbine parts, may be used in this invention. For instance, it is also contemplated that this invention may be utilized for removal of barrier coatings on CMCs used in marine environments, electronic applications, and power generators, such as gas, steam, and nuclear, to mention a few.

The inventors discovered that the temperature and concentration of the caustic solution, the pressure under which it is used to remove barrier coatings and bond coat, as well as the thickness of the barrier coating and/or bond coat and/or oxide layer determine the effectiveness of the removal process.

One aspect of the present disclosure is a method of removing a bond coat from a ceramic matrix composite. The method comprises contacting a ceramic matrix composite comprising a bond coat with at least one hydroxide for a sufficient time necessary for the hydroxide to react; and removing the bond coat from said ceramic matrix composite. Substantially all of the bond coat may be removed from the ceramic matrix composite component without damaging the ceramic matrix composite component.

The hydroxide may be potassium hydroxide, sodium hydroxide, ammonium hydroxide, lithium hydroxide, tetramethylammonium hydroxide, and/or combinations thereof. The hydroxide can be, in a particular example, sodium hydroxide. In contrast to prior art, the hydroxide is not a supercritical fluid, in one example. The hydroxide may comprise at least 5 weight % of a hydroxide and the balance is essentially water. In a particular example, the hydroxide comprises about 10 weight % to about 40% of sodium hydroxide.

The ceramic matrix composite comprises oxide or non-oxide fibers in nonoxide matrices. In a particular example, the ceramic matrix composite comprises SiC fibers in SiC matrices, SiC fibers in silicide containing matrices, SiC fibers in Si—SiC matrices, carbon fibers in carbon matrices, carbon fibers in SiC matrices, or alumina fibers in SiC matrices. The bond coat may comprise silicon or a silicon-containing substrate.

Mechanical methods for removing coatings from CMCs are disadvantageous because of the unique nature of CMCs. Areas where fibers are exposed underneath of the coatings (such as machined areas, near cooling holes, and at edges) are prone to severe damage. Mechanical methods can damage the exposed fibers and cause them to be released from the surface. Because the fibers are brittle and poorly bonded to the matrix, damage can rapidly progress through the entire fiber ply weakening that area and reducing the ability of that ply to carry load. This may also reduce the damage tolerance of the composite. Because of this, the inventors of the instant application discovered that it is important to have a chemical method of removing coatings (particularly the bondcoat which is in contact with the CMC) and oxide scale from the surface of the CMC that does not induce mechanical damage and does not damage any of the components of the CMC system including fiber, matrix, and fiber coatings.

The present disclosure teaches that the contacting and removing steps may be performed at an elevated temperature and/or pressure above ambient. In particular, an elevated temperature is, for example, at least about 120 degrees Celsius and an elevated pressure of about 0.1 to 1 MPa. The solution may be at a temperature of at least about 50 degrees Celsius at ambient pressure. The contacting and removing steps may be performed simultaneously with providing ultrasonic energy to said liquid. The ceramic matrix composite with the barrier coating and/or bond coat may be contacted with the hydroxide for 30 seconds or more. The method of the present disclosure may further include the step of contacting the substrate with water at a lower temperature than the temperature of said caustic liquid following the step of contacting with said hydroxide. The coated substrate may be immersed in a caustic liquid contained in a vessel open to ambient atmosphere. The method may further comprise removing an oxide layer from the ceramic matrix composite.

One aspect of the present disclosure is a method of removing a barrier coating from a ceramic matrix composite. The method comprises contacting a coated ceramic matrix composite with a caustic liquid comprising at least one hydroxide for a sufficient time necessary for said liquid to chemically attack the bondcoat beneath the barrier coating, causing detachment of said barrier coating from said ceramic matrix composite, thereby removing the barrier coating.

Another aspect of the present disclosure is a method of removing a bond coat from a ceramic matrix composite. The ceramic matrix composite may comprise oxide or non-oxide fibers in nonoxide matrices. Examples of ceramic matrix composite includes SiC fibers in SiC matrices, SiC fibers in silicide containing matrices, SiC fibers in Si—SiC matrices, carbon fibers in carbon matrices, carbon fibers in SiC matrices, or Alumina fibers in SiC matrices.

One aspect of the present disclosure is a method of removing an oxide layer from a ceramic matrix composite. The method comprises contacting a ceramic matrix composite comprising an oxide layer with at least one hydroxide for a sufficient time necessary for said hydroxide to react; and removing the oxide layer from said ceramic matrix composite. The oxide layer, in one example, comprises silica. Sodium hydroxide may be used as the hydroxide.

Another aspect of the present disclosure is a method of removing a bond coat from a ceramic matrix composite. The method comprises contacting a ceramic matrix composite comprising a bond coat with an aqueous solution containing at least one nitrogen containing base for a sufficient time necessary for said solution to react; and removing the bond coat from said ceramic matrix composite. The nitrogen containing base may be ethylene diamine, pyrazine, ethanolamine, or hydrazine or combinations thereof. Additionally an organic may be added to the solution. Substantially all of the bond coat can be removed by this method from the ceramic matrix composite component without damaging the ceramic matrix composite component. The ceramic matrix composite may comprise oxide or non-oxide fibers in non-oxide matrices. Examples of ceramic matrix composite includes SiC fibers in SiC matrices, SiC fibers in silicide containing matrices, SiC fibers in Si—SiC matrices, carbon fibers in carbon matrices, carbon fibers in SiC matrices, or Alumina fibers in SiC matrices.

One advantage of the present disclosure is that the underlying substrate, ceramic matrix composite, is not damaged, which allows multiple removals to be performed. This is a substantial savings in refurbishing time and costs.

EXAMPLES

The disclosure, having been generally described, may be more readily understood by reference to the following examples, which are included merely for purposes of illustration of certain aspects and embodiments of the present disclosure, and are not intended to limit the disclosure in any way.

Steps for Hydroxide Stripping:

For NaOH solutions, labware was nickel or stainless steel that was rated for NaOH.

1) Prepare the samples by cleaning any dirt or grime off of them. I have used an acetone wash followed by an ultrasonic bath in alcohol to ensure that any organics are removed. This was necessary to ensure that accurate weights could be taken. For actual large scale practice, this may be unnecessary because NaOH is an excellent degreaser.

2) Dilute NaOH to the desired concentration
   a. Weigh out room temperature DI water
   b. Weigh out NaOH
   c. Slowly add NaOH to room temperature water under constant stirring Warning-Dilution of NaOH is exothermic. The water should always be cold or room-temperature to ensure that the heat of dilution does not cause the solution to boil. The solution is stirred to ensure that the heat of reaction is distributed throughout the solution.

3) After the temperature of the solution had stopped climbing, the hot plate was turned to the desired temperature. In one example, the temperature of the hotplate was controlled by a thermoprobe immersed in the solution.

4) Once the target temperature was reached, the samples were suspended in the solution. For the lab scale, stainless steel wire, nickel wire, or Teflon (PTFE) cord are used to support the sample from an external support. For larger scales, a basket of suitable material can be used. The water vapor coming off the solution can be trapped and returned to the solution so that the concentration remains constant. This can be done with a condenser, but a vented beaker cover can perform this task for short runs. The concentration can be estimated via density measurements at room temperature.

The reaction produces H2 gas, and as such, the container is not sealed. The H2 gas is allowed to escape the reaction vessel and be diluted with sufficient air to be below the lower flammable concentration limit (4 mol %).

5) Throughout the etch process, stirring or agitation of the solution was maintained. This will ensure transfer of reaction products away from the surface and replenishment with fresh NaOH solution.

6) After the etch was complete, the samples were removed from the solution and rinsed in water. The first rinse water was treated as hazardous waste.

7) Any particulate residue from the surface was removed by cleaning in an ultrasonic bath, and a final rinse with deionised water was performed. The sample was then dried.

In one example, the stripping process step-by-step was:

| 1 | Measure the external dimensions and calculate the planar surface area |
| 2 | Wash the sample in acetone |
| 3 | Wash the sample in methanol using an ultrasonic bath |
| 4 | Dry the sample |
| 5 | Weigh the sample |
| 6 | Attach the sample to stainless steel wire |
| 7 | Connect the stainless steel wire to the beaker cover |
| 8 | Set samples and beaker cover aside |
| 9 | Weigh out DI water for solution into stainless steel beaker |
| 10 | Weigh out NaOH |
| 11 | Under constant stirring, slowly add NaOH to water |
| 12 | Monitor the temperature |
| 13 | After the temperature has stopped climbing, turn on the hot plate and set at the desired setpoint. |
| 14 | After the solution has reached the desired temperature, place the cover on the beaker suspending the samples in the solution. Keep the solution stirring. |
| 15 | Monitor the temperature of the solution during the etching |
| 16 | Periodically evaluate the etching progress by removing the samples from the NaOH solution, rinsing with water, and drying. When dry, it is possible to evaluate the etch progress for both the bondcoat and oxides. |
| 17 | After the etch is complete, remove the samples from the solution and rinse with DI water. |
| 18 | De-smut the samples using an ultrasonic bath |
| 19 | Rinse the samples in DI water |
| 20 | Dry the samples at 100 C. to remove any adsorbed or absorbed water |
| 21 | Weigh the samples and calculate the mass change per unit area |
| 22 | Encase the samples in epoxy. Section and polish to evaluate microstructural attack |

In one example, the etch process for a 100 um thick bondcoat (no EBC on top) was: 90 C for 1 hr in a 25% solution of NaOH at ambient pressure. In another example, the etch process for a 10 um thick oxide scale was: 90 C for 4 hrs in a 25% solution of NaOH at ambient pressure.

TABLE 1

Etch Rate Table—Coupon Testing

| | 20% NaOH | | | 25% NaOH | | | | | |
|---|---|---|---|---|---|---|---|---|---|
| | RT-26 hrs | 60 C-4 hrs | 90 C-4 hrs | 90 C-4 hrs | 90 C-4 hrs | 90 C-4 hrs | 90 C-8 hrs | 90 C-8 hrs | 90 C-8 hrs |
| Fused Silica | 0.000 | 0.026 | 0.212 | 0.300 | 0.260 | | | | |
| CMC | 0.001 | 0.053 | 0.223 | 0.257 | 0.172 | 0.216 | 0.257 | 0.225 | 0.253 |
| Silicon | 0.237 | 6.081 | | | | | | | |
| Oxidized CMC* | | | | 0.53* | 2.42* | | | | |

Figure 1:
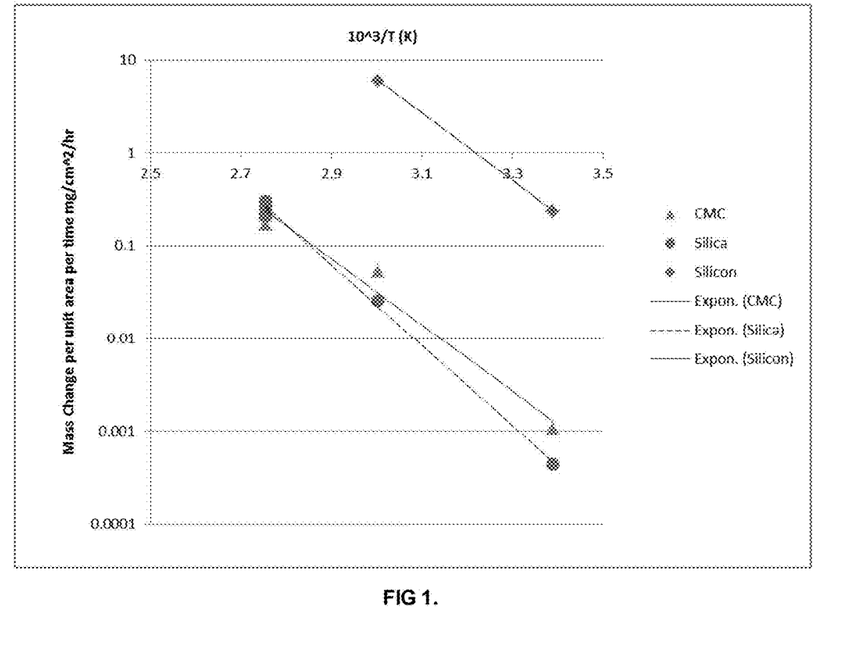
Figure 2:
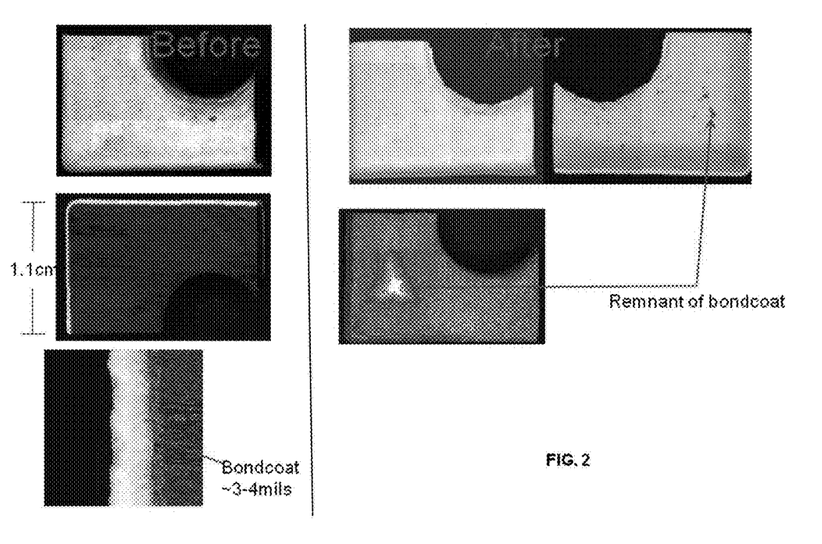
Figure 3:
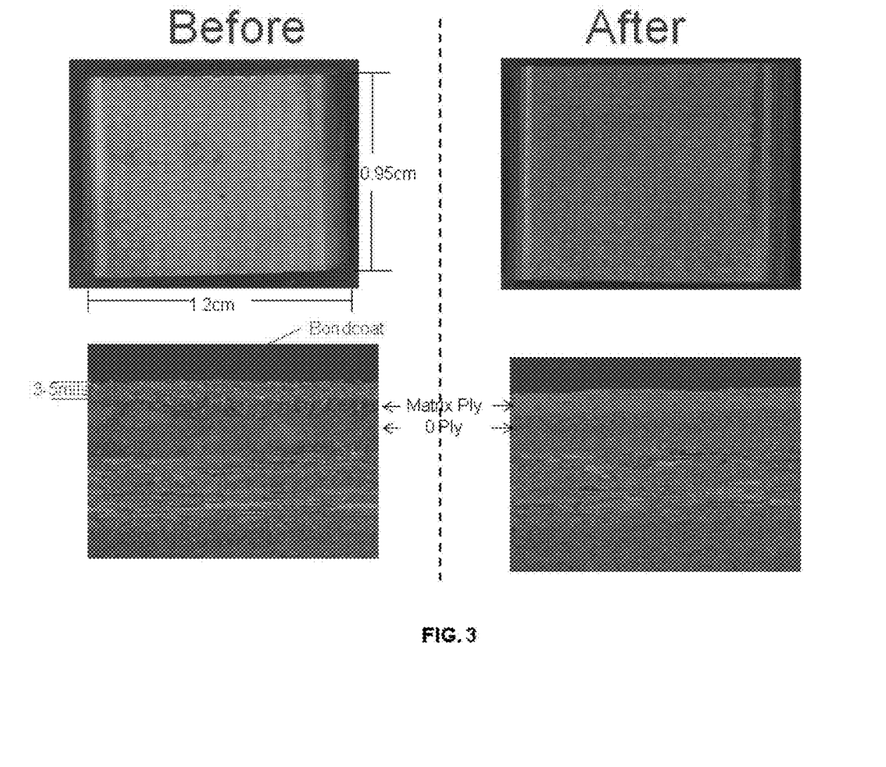
Figure 4:
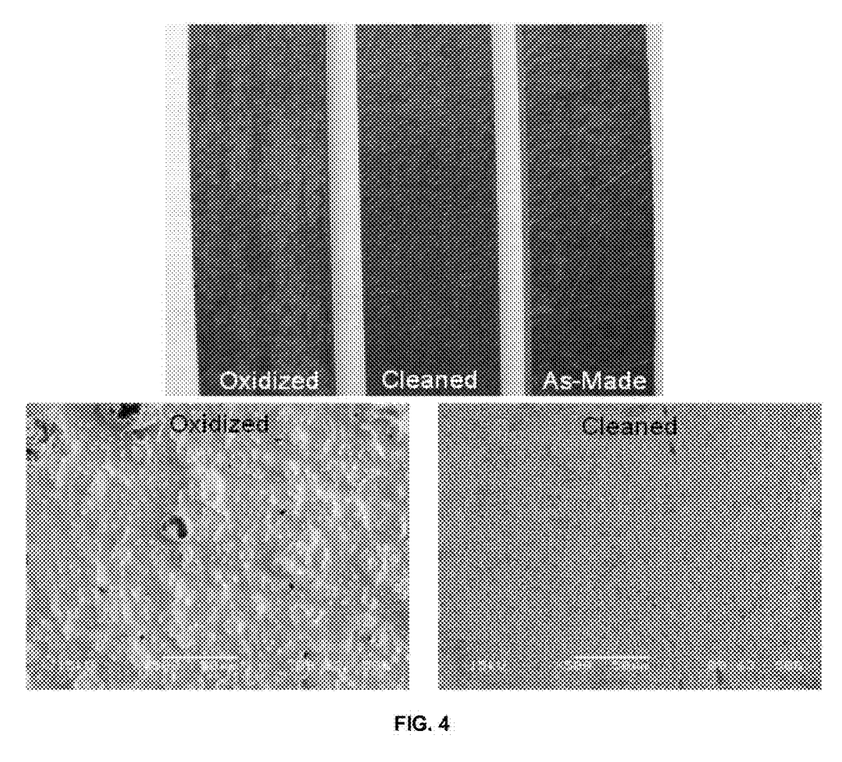

Values are in mg/cm$^2$/hr
*The oxide was completely removed before the etch process was completed so these values are conservative In order to evaluate the attack on each component of the CMC system, coupons of silica (amorphous), CMC (Si—SiC/SiC), Silicon (representing the bondcoat material), and oxidized (100 hrs at 1315 C) CMC were submerged in NaOH solutions. The mass was measured before and after each treatment and the mass loss per time per unit area was calculated. For the oxidized CMC, the oxide was completely etched away before the end of the etch treatment, so these particular results underestimate the etch rate for the thermally grown oxide. The thermally grown oxide etches much faster than the silica coupon because of its high surface area. It is seen that the silicon etches two orders of magnitude faster than the CMC and that the Fused Silica etches at a similar rate to the CMC.

| Panel Number | Condition | Proportional Limit (ksi) | Elastic Modulus (Msi) | Ultimate Strength (ksi) |
|---|---|---|---|---|
| 1 | As made | 32.1 | 39.0 | 32.2 |
| 1 | Cleaned | 29.2 | 36.3 | 31.3 |

-continued

| Panel Number | Condition | Proportional Limit (ksi) | Elastic Modulus (Msi) | Ultimate Strength (ksi) |
|---|---|---|---|---|
| 2 | Oxidized | 22.9 | 40 | 33.3 |
| 2 | Oxidized and Cleaned | 21.9 | 37.8 | 35.2 |

In order to verify that this stripping method has no impact on the mechanical performance of the as-made CMC, uniaxial tension samples from panel 1 were tested in both the as-made and cleaned condition (treated in 25% NaOH at 90 C for 4 hours at ambient pressure). 4 samples were tested per condition. The average results are presented in the above table. No degradation in mechanical performance was observed.

As the oxidized CMC has somewhat different mechanical properties compared to the as-made CMC, a similar experiment was run on panel 2 with oxidized test bars (in air at 1315 C for 100 hrs) and oxidized and cleaned (25% NaOH at 90 C for 4 hours) test bars. Again, the average results are provided in the table. No degradation in the mechanical performance was observed.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any individual skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of removing a bond coat from an article, the article comprising a ceramic matrix composite substrate and a bond coat comprising elemental silicon and silica disposed on the ceramic matrix composite substrate, said method comprising: contacting the article with a solution comprising at least 5 weight percent of at least one hydroxide for a sufficient time necessary for said at least one hydroxide to react with the bond coat and remove the bond coat from said ceramic matrix composite substrate.

2. The method of claim 1, wherein substantially all of the bond coat is removed from the ceramic matrix composite substrate without damaging the ceramic matrix composite substrate.

3. The method of claim 1, wherein said at least one hydroxide is selected from a group consisting of potassium hydroxide, sodium hydroxide, ammonium hydroxide, lithium hydroxide, and tetramethylammonium hydroxide.

4. The method of claim 1, wherein said at least one hydroxide is sodium hydroxide.

5. The method of claim 1, wherein the ceramic matrix composite substrate comprises SiC fibers in a SiC matrix, SiC fibers in a suicide containing matrix, SiC fibers in a Si—SiC matrix, carbon fibers in a carbon matrix, carbon fibers in a SiC matrix, or Alumina fibers in a SiC matrix.

6. The method of claim 5, wherein the ceramic matrix composite substrate comprises SiC fibers in a Si—SiC matrix.

7. The method of claim 1, wherein the solution further comprises water.

8. The method of claim 1, wherein the solution comprises about 10 weight % to about 40% of sodium hydroxide.

9. The method of claim 1, wherein the contacting and removing steps are: performed at an elevated temperature and pressure above ambient.

10. The method of claim 9, wherein an elevated temperature is at least about 120 degrees Celsius and an elevated pressure of about 0.1 to 1 MPa.

11. The method of claim 1, wherein the solution is at a temperature of at least about 50 degrees Celsius.

12. The method of claim 1, wherein the contacting and removing steps are performed simultaneously with providing ultrasonic energy to said solution.

13. The method of claim 1, wherein the article is contacted with the solution for 30 seconds or more.

14. The method of claim 1, further including the step of contacting the substrate with water at a lower temperature than the temperature of said solution following the step of contacting with said solution.

15. The method of claim 1, wherein the contacting step comprises immersing the article in the solution, wherein the solution is contained in a vessel open to ambient atmosphere.

* * * * *